(12) United States Patent
Chen et al.

(10) Patent No.: US 11,842,457 B2
(45) Date of Patent: Dec. 12, 2023

(54) METHOD FOR PROCESSING SLIDER FOR VIRTUAL CHARACTER, ELECTRONIC DEVICE, AND STORAGE MEDIUM

(71) Applicant: Beijing Baidu Netcom Science Technology Co., Ltd., Beijing (CN)

(72) Inventors: Ruizhi Chen, Beijing (CN); Sheng Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 78 days.

(21) Appl. No.: 17/646,116

(22) Filed: Dec. 27, 2021

(65) Prior Publication Data
US 2022/0122337 A1 Apr. 21, 2022

(30) Foreign Application Priority Data

Mar. 24, 2021 (CN) .......................... 202110316415.X

(51) Int. Cl.
*G06T 19/20* (2011.01)
*G06T 15/04* (2011.01)
*G06T 17/20* (2006.01)

(52) U.S. Cl.
CPC .............. *G06T 19/20* (2013.01); *G06T 15/04* (2013.01); *G06T 17/20* (2013.01); *G06T 2219/2016* (2013.01); *G06T 2219/2021* (2013.01)

(58) Field of Classification Search
CPC ......... G06T 19/20; G06T 15/04; G06T 17/20; G06T 2219/2016; G06T 2219/2021
See application file for complete search history.

(56) References Cited

U.S. PATENT DOCUMENTS

2009/0262118 A1* 10/2009 Arikan .................... G06T 13/40
345/473
2017/0256098 A1 9/2017 Yumer
(Continued)

FOREIGN PATENT DOCUMENTS

CN 101241600 A * 8/2008
CN 112184921 1/2012
(Continued)

OTHER PUBLICATIONS

Cheng ("Human Skeleton System Animation.", 2017, master thesis) (Year: 2017).*
(Continued)

*Primary Examiner* — Xin Sheng
(74) *Attorney, Agent, or Firm* — Hamre, Schumann, Mueller & Larson, P.C.

(57) ABSTRACT

The present disclosure discloses a method for processing a slider for a virtual character, an electronic device, and a storage medium, relating to a field of virtual reality, in particular to fields of artificial intelligence, Internet of Things, voice technology, cloud computing, etc. An implementation includes: acquiring a shape model associated with a target semantic tag; acquiring a skeleton and skinning information of a reference virtual character; fitting the shape model based on the skeleton and skinning information to obtain a skeleton linkage coefficient; and generating a slider associated with the target semantic tag based on the skeleton linkage coefficient, wherein the slider is used to drive the reference virtual character to obtain a target virtual character complying with a target semantic feature contained in the target semantic tag.

12 Claims, 9 Drawing Sheets

(56) References Cited

U.S. PATENT DOCUMENTS

2019/0272668 A1* 9/2019 Echevarria Vallespi .................... G06T 15/503
2020/0020173 A1* 1/2020 Sharif .................... G06T 19/20

FOREIGN PATENT DOCUMENTS

| CN | 107481304 | | 12/2017 | | |
|----|-----------|---|---------|---|---|
| CN | 107944542 | | 4/2018 | | |
| CN | 107944542 | A * | 4/2018 | ............. | G06F 40/30 |
| CN | 109326151 | | 2/2019 | | |
| CN | 109448737 | | 3/2019 | | |
| CN | 110599573 | | 12/2019 | | |
| CN | 110717977 | | 1/2020 | | |
| CN | 110766777 | | 2/2020 | | |
| CN | 111833418 | | 10/2020 | | |
| CN | 112182194 | | 1/2021 | | |
| CN | 112509098 | | 3/2021 | | |
| CN | 112509099 | | 3/2021 | | |
| JP | 2004-246891 | | 9/2004 | | |
| WO | WO-2017175423 | A1 * | 10/2017 | ............. | G06T 13/40 |

OTHER PUBLICATIONS

First Chinese Office Action, issued in the corresponding Chinese patent application No. 202110316415 X, dated Aug. 24, 2021, 9 pages.
Second Chinese Office Action, issued in the corresponding Chinese patent application No. 202110316415.X, dated Nov. 19, 2021, 10 pages.
First Korean Office Action, issued in the corresponding Korean patent application No. 10-2021-0188820, dated Mar. 15, 2023, 15 pages with machine translation.
Liu et al., "Segmentation mask-guided person image generation", Applied Intelligence (2021), vol. 51, pp. 1161-1176, Sep. 17, 2020.
Memorandum, Apr. 20, 2022, 2 pages.
First Japanese Office Action, issued in the corresponding Japanese patent application No. 2021-212729, dated Oct. 1, 2023, 8 pages.
Extended European Search Report, issued in the corresponding European patent application No. 21218175.4, dated Jul. 15, 2022, 10 pages.

* cited by examiner

Wide face model

Narrow face model

Long face model

Short face model

METHOD FOR PROCESSING SLIDER FOR VIRTUAL CHARACTER, ELECTRONIC DEVICE, AND STORAGE MEDIUM

CROSS-REFERENCE TO RELATED APPLICATIONS

This application is claims priority to Chinese Application No. 202110316415.X filed on Mar. 24, 2021, which is incorporated herein by reference in its entirety.

TECHNICAL FIELD

The present disclosure relates to a field of virtual reality, in particular to fields of artificial intelligence, Internet of Things, voice technology, cloud computing, etc., and specifically to a method for processing a slider for a virtual character, an electronic device, and a non-transitory computer-readable storage medium storing computer instructions.

BACKGROUND

In the future augmented reality system, the virtual character will be the main carrying method of human-computer interaction.

At present, an App for generating a virtual character usually requires a user to upload a photo, and then generates a primary virtual character automatically based on the portrait in the photo. However, in order to implement the final virtual character, the user is also required to manually pinch the face of the primary virtual character by using the pinching face function in the App.

SUMMARY

The present disclosure provides a method for processing a slider for a virtual character, an electronic device, and a storage medium.

According to an aspect of the present disclosure, a method for processing a slider for a virtual character is provided, including: acquiring a shape model associated with a target semantic tag; acquiring a skeleton and skinning information of a reference virtual character; fitting the shape model based on the skeleton and skinning information to obtain a skeleton linkage coefficient; and generating a slider associated with the target semantic tag based on the skeleton linkage coefficient, wherein the slider is used to drive the reference virtual character to obtain a target virtual character complying with a target semantic feature contained in the target semantic tag.

According to another aspect of the present disclosure, an electronic device is provided, including: at least one processor; and a memory communicatively connected with the at least one processor; wherein the memory stores instructions executable by the at least one processor, and the instructions are executed by the at least one processor to cause the at least one processor to perform the method according to the embodiments of the present disclosure.

According to another aspect of the present disclosure, a non-transitory computer-readable storage medium storing computer instructions is provided, wherein the computer instructions are configured to cause the computer to perform the method according to the embodiments of the present disclosure.

It should be understood that the content described in this section is not intended to identify key or important features of the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the solutions, and do not constitute a limitation to the present disclosure. Wherein.

DETAILED DESCRIPTION OF EMBODIMENTS

The following describes exemplary embodiments of the present disclosure with reference to the drawings, which include various details of the embodiments of the present disclosure to facilitate understanding, and should be regarded as merely exemplary. Therefore, those skilled in the art should recognize that various changes and modifications may be made to the embodiments described herein without departing from the scope and spirit of the present disclosure. Likewise, for clarity and conciseness, descriptions of well-known functions and structures are omitted in the following description.

At present, an App for generating a virtual character usually requires a user to upload a photo, and then generates a primary virtual character automatically based on the portrait in the photo. However, in order to implement the final virtual character, the user is also required to manually pinch the face of the primary virtual character by using the face pinching function in the App.

Although the solution of automatic generation and then manual customization may eventually give a result of a virtual character, it is often difficult for the user to acquire a satisfactory virtual character. The reason is that through this traditional solution, it is impossible for the user to achieve an efficient customization of the virtual character.

Exemplarily, if a user is intended to generate a virtual character with a high nose, big eyes and a thin chin through the above-mentioned traditional method, there is a high possibility that the user is unable to find a photo of a real person with similar character features. Further, even if a photo of a real person with similar character features may be found the user needs to search for a facial feature, for example, in the bases of nose shape, eye shape, and face shape etc. one by one, in using the above-mentioned face pinching function. Generally, the App provides dozens of shapes for a single facial feature for the user to choose. Therefore, it takes tens or even dozens of minutes to select the shape of each facial feature. Many users may not have the patience to spend time to choose satisfactory facial features.

In addition, this traditional customization solution of the virtual character is not convenient for users to use and may even cause great frustration and experience damage to users.

An intelligent generation solution of a virtual character based on language description proposed in the present disclosure may implement the efficient customization of the virtual character. The disclosure will be described in detail below in conjunction with specific embodiments.

A system architecture, in which a method and apparatus for generating a virtual character according to the embodiments of the present disclosure may be applied, is introduced as follows.

Figure 1A:
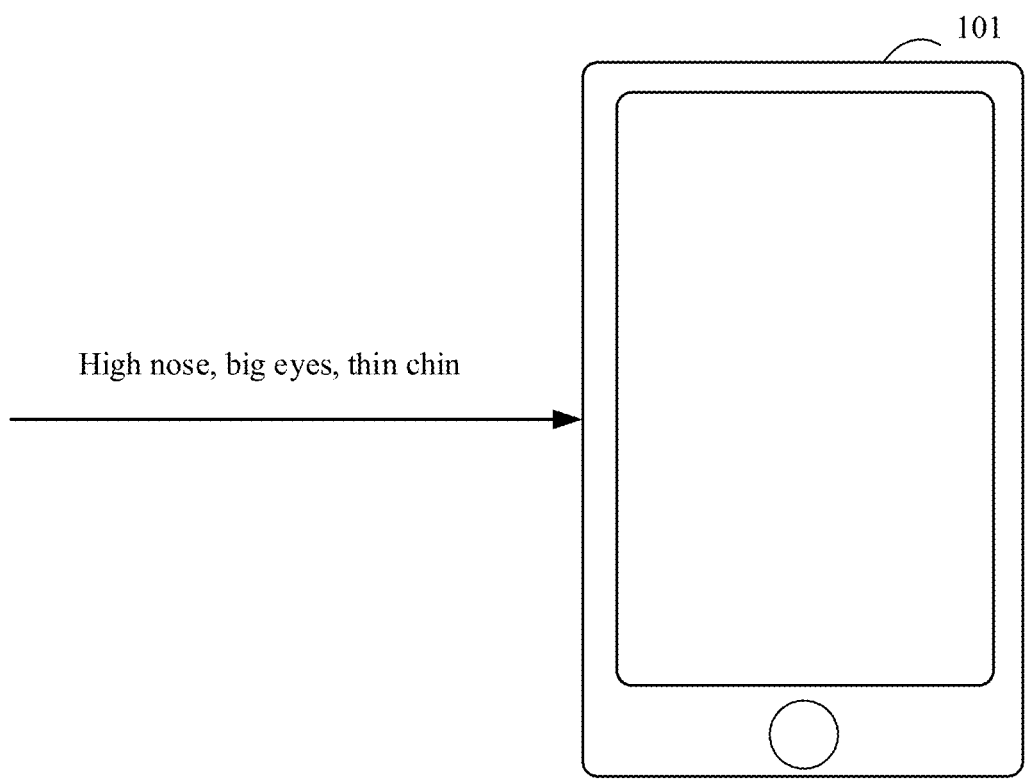
FIG. 1A exemplarily illustrates a system architecture in which a method and apparatus for generating a virtual character according to the embodiments of the present disclosure may be applied.

FIG. 1A exemplarily illustrates a system architecture in which a method and apparatus for generating a virtual character according to the embodiments of the present disclosure may be applied. It should be noted that FIG. 1A is just an example of the system architecture in which the embodiments of the present disclosure may be applied to help those skilled in the art to understand the technical content of the present disclosure, but it does not mean that the embodiments of the present disclosure may not be used in other environments or scenes.

As shown in FIG. 1A, the system architecture 100 may include: a terminal device 101. It should be noted that the terminal device 101 may be a client or a server, which is not limited in the present disclosure.

Specifically, an initial virtual character may be generated as a reference virtual character through the terminal device 101 or other apparatus. If a user wants to customize a virtual character as personally desired, such as a virtual character with "high nose, big eyes, thin chin", the user may describe the desired virtual character through language. After the terminal device 101 obtains the language description generated by the user, a respective semantic feature may be extracted based on the language description, and then the desired virtual character is generated based on the extracted semantic feature.

In the embodiments of the present disclosure, according to the language description generated the user, the terminal device 101 may accurately recognize a semantic feature information of the virtual character required by the user, and then generate the virtual character intelligently. On the one hand, the solution may improve the efficiency of producing a customized virtual character and give user a more convenient experience; on the other hand, it may also improve the accuracy of customization of the virtual character and provide a satisfactory virtual character to user.

It should be understood that the number of terminal devices in FIG. 1A is illustrative. Any number of terminal devices may be included as desired in practice.

A scenario in which the method and apparatus for generating a virtual character according to the embodiments of the present disclosure may be applied are introduced as follows.

It should be understood that at present, the offline consumption guidance is mainly based on bloggers visiting stores and sharing their experiences. If consumers do not actively read the content shared by bloggers, it is difficult to achieve an effective recommendation.

It should also be understood that the customized virtual character usually has similarity with real person, different virtual characters are distinguished from each other, and the cartoon appearance of the virtual character may also have an enhanced affinity. All this may help improve the subjective recognition of the virtual character by the user. In this way, a virtual character may be created, a human-computer interaction may be achieved based on the virtual character, and a consumption recommendation and a consumption accompanying may be provided in proper time by using the virtual character during the process of human-computer interaction based on the virtual character. In this way, the conversion rate of consumption recommendation may effectively increase while the user experience may be improved.

Exemplarily, in the embodiments of the present disclosure, a guidance of offline consumption may be provided to the user in the home scene based on the virtual character, and a consumption accompanying may be provided to the user in the offline consumption scene based on the virtual character.

Figure 1B:
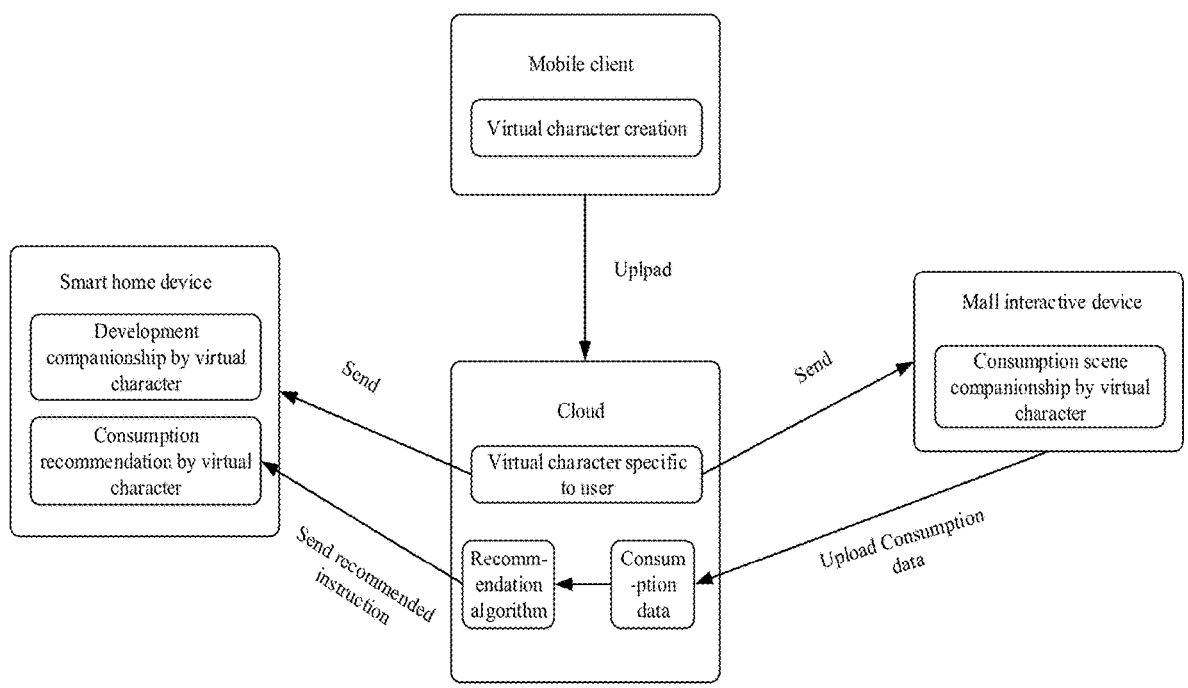
FIG. 1B exemplarily illustrates a diagram of a scenario in which the method and apparatus for generating a virtual character according to the embodiments of the present disclosure may be implemented.

As shown in FIG. 1B, the user may create a virtual character specific to the user through a mobile client and upload the virtual character to a cloud. Then the virtual character is sent to a smart device associated with the user and an interactive device (such as mall interactive device, supermarket interactive device, restaurant interactive device, etc.) deployed in public places such as supermarket visited by user, so that the user may use it during human-computer interaction.

It should be noted that, in the embodiments of the present disclosure, the smart device includes an IoT device with a display, such as a refrigerator, a television, a smart mirror, a smart glass and so on. After the virtual character is sent to the IOT device, the IOT device may be triggered to display the virtual character in real time, so that the virtual character vividly communicates with the user in a functional or meaningless dialogue as a front-end carrier of an intelligent voice dialogue system. In the process of dialogue and communication, the virtual character may provide a consumption recommendation to user offline in proper time according to a marketing recommendation instruction sent by the cloud.

In addition, in the embodiments of the present disclosure, the mall interactive device also includes an electronic apparatus having a capability of interfacing with a user, which contains a display and is deployed in the mall. Exemplarily, when the user visits the mall, the identification of the user may be determined through face recognition technology, and the cloud is notified to send the respective virtual character. For example, when user A tries on clothes in a certain brand clothing store, a virtual character specific to user A may be sent from the cloud, and the virtual character specific to user A is displayed on the edge of the fitting mirror near user A to interact with the user, such as recommend the user to try clothes. For another example, when user B eats single-person hot pot in a hot pot restaurant, a small display may be set up next to the hot pot of user B, and a virtual character specific to user B may be displayed on the small display to perform meaningless interaction with user B or play a game with user B.

In an embodiment of the present disclosure, the user may upload a photo, and then the virtual character generation App automatically generates a primary virtual character based on the portrait in the photo. Then the user may manually pinch the face of the primary virtual character by using the face pinching function in the App, in order to generate a virtual character specific to the user.

In another embodiment of the present disclosure, the user may also generate a virtual character specific to the user through the intelligent generation solution of virtual character based on language description.

In another embodiment of the present disclosure, in addition to receiving the virtual character created by the mobile client and sending the virtual character to the smart device associated with the user and the interactive device deployed in a public place such as a supermarket visited by the user, the cloud may also analyze big data of user(s) and provide a marketing strategy at proper time, in order to achieve a marketing task by using the virtual character displayed on the smart home device. For example, it rains on a certain day, the weather is very cold, and the user has not eaten hot pot for a long time, then the virtual character may affectionately recommend a hot pot dining place to the user.

According to the embodiments of the present disclosure, providing a service of accompanying consumption recommendation by using a virtual character similar to a real person may cause the user to feel acceptance. Through the recommendation by the virtual character, the user consumption may also be guided to offline scene. And in real consumption scenes, the virtual character specific to the user may also accompany the user, to recommend products to user, accompany the user to eat and chat. In this way, online services and offline services may be connected.

The present disclosure provides a human-computer interaction method based on a virtual character.

The human-computer interaction method may be applied to a home scene, including the following operations.

A virtual character is displayed on a smart device.

The virtual character is controlled to communicate and interact with a user.

In the process of communication and interaction between the virtual character and the user, the virtual character is controlled to provide a consumption recommendation to the user.

In an embodiment of the present disclosure, the smart device may include a smart home device. Exemplarily, in the home scene, after the smart home device is triggered, a virtual character specific to the user may be displayed on the display of the smart home device. In other embodiments of the present disclosure, after the smart home device is triggered, other virtual character(s) that is/are not specific to the user may be displayed on the display of the smart home device.

As a front-end carrier of the intelligent voice dialogue system, the virtual character displayed on the smart home device may vividly perform functional or meaningless dialogue, a game interaction, etc. with user. In the process of dialogue or game interaction, the virtual character may provide offline consumption recommendation to user in proper time according to the marketing recommendation instruction (including marketing strategies) sent by the cloud. For example, it rains on a certain day, the weather is very cold, and the user has not eaten hot pot for a long time, then the virtual character may affectionately recommend a hot pot dining place to the user.

In the home scene, user may establish trust and acceptance of the virtual character by communicating and interacting with the virtual character on the smart home device. Therefore, the customized virtual character becomes the development companionship object of the user. In this way, the cloud directly sends the marketing recommendation instruction to the virtual character, and the possibility that the virtual character achieves the consumption guidance is increased.

In the embodiments of the present disclosure, the trust and acceptance of the user for virtual character may be established through the companionship of the customized virtual character, thereby implementing the consumption recommendation by using the virtual character as an interactive carrier, and improving the conversion rate of consumption recommendation.

As an optional embodiment, controlling the virtual character to provide a consumption recommendation to the user may include the following operations.

The marketing strategy sent by the cloud for the user is acquired.

The virtual character is controlled to provide a consumption recommendation to the user based on the marketing strategy.

In another embodiment of the present disclosure, in addition to receiving the virtual character created by the mobile client and sending the virtual character to the smart device associated with the user and the interactive device deployed in a public place such as a supermarket visited by the user, the cloud may also analyze the big data of user(s) and provide a targeted marketing strategy for specific user at proper time. The virtual character displayed on the smart home device is controlled to achieve the marketing task. In this way, precise marketing may be implemented, and more reasonable, more accurate and more satisfying consumption recommendation is provided to user.

As an optional embodiment, displaying the virtual character on the smart device may include: displaying the virtual character specific to the user on the smart device. The virtual character specific to the user is sent from the cloud to the smart device.

Exemplarily, a user may create a virtual character specific to the user through the mobile client, the virtual character is uploaded to the cloud. Then, when the user triggers the smart device, the cloud will send the created virtual character specific to the user to a smart home device for displaying.

In the embodiments of the present disclosure, it is easier to obtain the trust and acceptance of the user in the development companionship of virtual character by using the virtual character specific to the user, and thus it is easier to achieve the consumption recommendation by the virtual character.

The present disclosure also provides a control method based on a virtual character.

The control method based on the virtual character may be applied to a server such as the cloud, and includes the following operations.

The virtual character displayed on the smart device is remotely controlled to communicate and interact with user.

In the process of communication and interaction between the virtual character and the user, a marketing strategy for the user is sent to the smart device, so that the virtual character may be used to provide a consumption recommendation to the user based on the marketing strategy.

In an embodiment of the present disclosure, taking the home scene as an example, the smart device includes a smart home device. After the smart home device is triggered, the cloud may remotely control the smart home device, e.g. to display the virtual character specific to the user on the display of the smart home device. In other embodiments of the present disclosure, after the smart home device is triggered, the cloud may also remotely control the smart home device, e.g. to display other virtual character(s) that is/are not specific to the user on the display of the smart home device.

As a front-end carrier of the intelligent voice dialogue system, the virtual character is displayed on the smart home device may vividly perform functional or meaningless dialogue and game interaction with user. In the process of dialogue or game interaction, the virtual character may provide an offline consumption recommendation to user at proper time according to the marketing recommendation instruction (including a marketing strategy) sent by the cloud. For example, it rains on a certain day, the weather is very cold, and the user has not eaten hot pot for a long time, then the virtual character may affectionately recommend a hot pot dining place to the user.

In the home scene, the user may establish trust and recognition of the virtual character by communicating and interacting with the virtual character on the smart home device. Therefore, the customized virtual character becomes the development companionship object of the user. In this way, the cloud directly sends the marketing recommendation instruction to the virtual character, such that the possibility that the virtual character achieves the consumption guidance is increased.

In the embodiments of the present disclosure, the trust and acceptance of the user for virtual character may be established through the companionship of the customized virtual character, thereby implementing the consumption recommendation using the virtual character as an interactive carrier and improving the conversion rate of consumption recommendation.

As an optional embodiment, the method further includes the following operations.

The virtual character specific to the user provided by user is acquired.

The virtual character specific to the user is sent to the smart device associated with the user, so that the smart device displays the virtual character specific to the user when facing the user and performs human-computer interaction with the user through the virtual character specific to the user.

Exemplarily, user may create a virtual character specific to the user through the mobile client, the virtual character is uploaded to the cloud, and then when the user triggers the smart device, the cloud will send the created virtual character specific to the user to the smart homes for displaying, and the virtual character is used to communicate and interact with the user.

In the embodiments of the present disclosure, by using the virtual character specific to the user, it is easier to obtain the trust and acceptance of the user in the development companionship by the virtual character, and thus it is easier to achieve the consumption recommendation by the virtual character.

As an optional embodiment, the method further includes the following operations.

A consumption data is acquired.

Based on the consumption data, a marketing strategy for the user is generated in order to be sent to the smart device.

Exemplarily, the cloud may acquire the consumption data uploaded by the interactive device and the cashier device installed in a public place such as a supermarket, and a big data analysis is performed based on the acquired consumption data, thereby generating the marketing strategy for an individual user or a certain group of users. The generated marketing strategy is sent to the smart device associated with the specific user or the specific category of users, so that the virtual character displayed on the smart device may provide a consumption recommendation to the user(s) at proper time. It should be noted that in the embodiments the consumption data is not consumption data for a specific user and does not reflect the personal information of the specific user. In the embodiments, the consumption data may be obtained from public dataset.

According to the embodiments of the present disclosure, the consumption habits may be learned from the consumption data, and then the marketing strategy that conforms to the consumption habits of the user may be formulated, thereby implementing precision marketing.

The present disclosure also provides another control method based on a virtual character.

The control method based on the virtual character may be applied to a consumption scene, including the following operations.

The virtual character is displayed on a specific interactive device in a specific place.

During an activity of user in the specific place, the virtual character is controlled to communicate and interact with the user.

It should be noted that, in the embodiments of the present disclosure, the specific place may include a public places such as a mall, a supermarket, a restaurant hotel etc. The specific interactive device may include an electronic device with a display.

Exemplarily, when the user visits the mall, the identity of the user may be determined through face recognition technology, and the cloud may be notified to send the respective virtual character to the mall interactive device near the user, so that the virtual character may interact with the user during the consumption process of user and accompany user in offline consumption.

According to the embodiments of the present disclosure, in the consumption scene, the virtual character specific to the user may appear on mall interactive device near the user, so as to accompany the user in the entire offline consumption process and provide the user with a better consumption experience.

As an optional embodiment, in the process of the activity of user in the specified place, the virtual character is controlled to communicate and interact with the user, may include at least one of the following.

In the process that the user is shopping in a mall or a supermarket, the virtual character is controlled to communicate with the user to accompany the user to shop.

In the process that the user is having dinner in the restaurant or hotel, the virtual character is controlled to chat with the user or play interactive game to accompany the user to have dinner.

In the process that the user consumes in the leisure and entertainment venue, the virtual character is controlled to communicate and interact with the user to accompany the user in leisure and entertainment.

Exemplarily, for example, when user A tries on clothes in a certain brand clothing store, the virtual character specific to user A may be sent from the cloud, and the virtual character specific to user A is displayed on the edge of the fitting mirror near user A, so as to interact with the user, such as recommending the user to try on clothes. For another example, when user B is having a single-person hot pot in a hot pot restaurant, a small display may be set up next to user B's hot pot, and the virtual character specific to user B may be displayed on the small display, so as to have meaningless interaction or game with user B.

According to the embodiments of the present disclosure, the virtual character similar to the real person in some extant is used to provide the accompanying consumption service, which may make user feel acceptance. And in the real consumption scene, the virtual character specific to the user accompanies the user, which may help the user to purchase a satisfactory product and accompany the user to have dinner, to chat and so on. In this way, online service and offline service may be connected.

As an optional embodiment, the method may further include the following operations.

A consumption data is acquired.

The consumption data is sent to the cloud so that the cloud may generate a marketing strategy for user based on the consumption data.

Exemplarily, the interactive device and a cashier device in a public place such as a mall and a supermarket may collect the consumption data and upload the consumption data to the cloud, and then the cloud performs big data analysis based on the acquired consumption data, thereby generating a marketing strategy for an individual user or a certain group of users, so that the cloud will send the marketing strategy to a respective smart home device, and the virtual character displayed on the smart home device will provide a consumption recommendation to the user(s) at proper time. It should be noted that in the embodiments the consumption data is not consumption data for a specific user and does not reflect the personal information of the specific user. In the embodiments, the consumption data may be obtained from public dataset.

According to the embodiments of the present disclosure, the consumption data may be collected and uploaded, so that the cloud may learn the consumption habits from the consumption data, and then the marketing strategy that conforms to the user's own consumption habits is generated, thereby implementing precision marketing.

As an optional embodiment, the method may further include the following operations.

In response to the user entering a specific place, a face of user is recognized to determine the identification of the user.

A virtual character specific to the user is acquired based on the identification of the user.

Wherein displaying the virtual character on a specific interactive device in the specific place may include: displaying the virtual character specific to the user on the specific interactive device in the specific place.

It should also be understood that the customized virtual character usually has similarity with real person, different virtual characters are distinguished from each other, and the cartoon appearance of the virtual character may also have an enhanced affinity. All this may help to improve the subjective recognition of the virtual character of the user. In this way, the virtual character may be created, the human-computer interaction may be implemented based on the virtual character, and a consumption recommendation and a consumption accompany may be provided by the virtual character during the process of human-computer interaction based on the virtual character. In this way, the conversion rate of consumption recommendation may be effectively increased while the user experience may be improved.

The user may create a virtual character specific to the user through the mobile client, the virtual character is uploaded to the cloud, and then the virtual character is sent to the smart device associated with the user and the interactive device (such as mall interactive device, supermarket interactive device, restaurant interactive device, etc.) deployed in a public place such as a supermarket visited by user, in order to be used by the user during human-computer interaction.

Exemplarily, when the user visits the mall, the identification of the user may be determined through face recognition technology, and the cloud is notified to send the virtual character, which is specific to the user and associated to the identification of the user, to the mall interactive device near the user. For example, when user A tries on clothes in a certain brand clothing store, an virtual character specific to user A may be sent from the cloud, and the virtual character specific to user A is displayed on the edge of the fitting mirror near user A to interact with the user, such as recommending the user to try clothes. For another example, when user B eats single-person hot pot in a hot pot restaurant, a small display may be set up next to the hot pot of user B, and a virtual character specific to user B may be displayed on the small display to perform meaningless interaction or games with user B.

According to the embodiments of the present disclosure, based on the smart home device, the mall interactive device and the cloud service, online marketing of home scenes based on the customized virtual character and home/shopping mall linkage marketing accompanied by offline consumption scenes are implemented. Therefore, the consumption guidance method (or marketing method) may be improved while the consumption experience of user may be improved, such as the accompanying consumption service provided by customized virtual character may be accepted by the user in an immersive manner.

According to the embodiments of the present disclosure, the present disclosure also provides a method for generating a virtual character.

Figure 2:
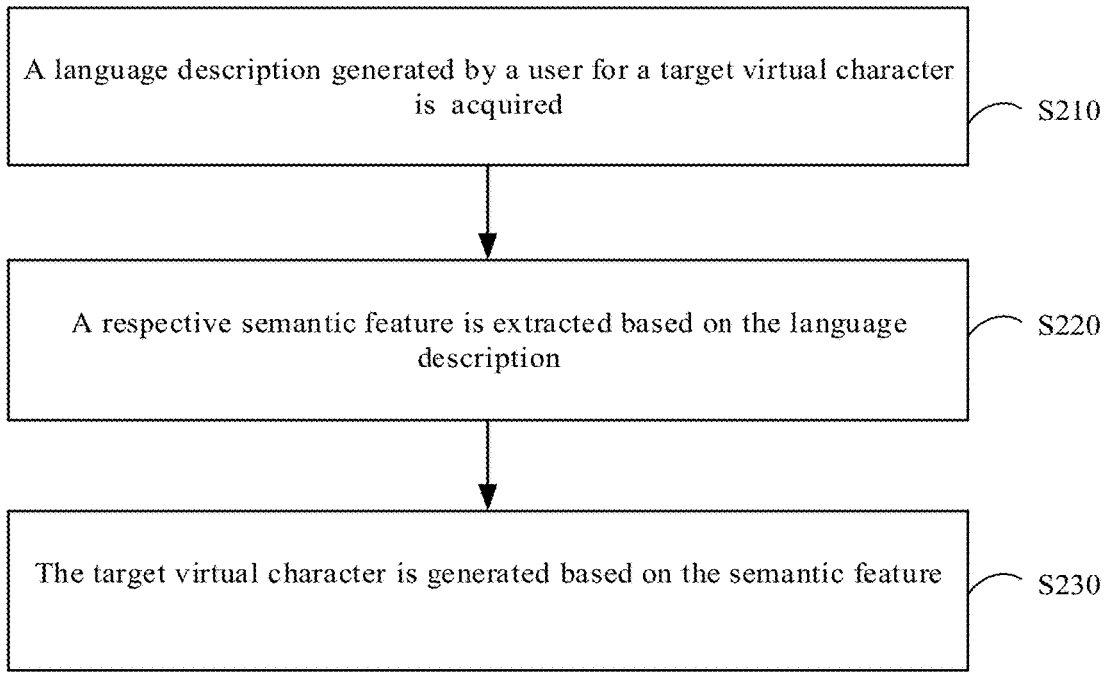
FIG. 2 exemplarily illustrates a flowchart of a method for generating a virtual character according to the embodiments of the present disclosure.

FIG. 2 exemplarily illustrates a flowchart of a method for generating a virtual character according to the embodiments of the present disclosure.

As shown in FIG. 2, the method 200 may include: operations S210 to S230.

In operation S210, a language description generated by a user for a target virtual character is acquired.

In operation S220, a respective semantic feature is extracted based on the language description.

In operation S230, the target virtual character is generated based on the semantic feature.

It should be noted that, in operation S210, the language description may include the language description in the form of voice or text, which is not limited in the embodiments of the present disclosure. Wherein, for the language description in the form of voice, in operation S210, a semantic requirement of user for the target virtual character may be captured through the automatic voice recognition ASR technology.

Exemplarily, if the user wants to create a target virtual character with "high nose, big eyes, thin chin", the user may input the following language description "high nose, big eyes, thin chin" for the target virtual character. Thus, through the above operations provided by the method 200, the language description "high nose bridge, big eyes, thin chin" may be acquired, and the semantic feature such as "high nose bridge, big eyes, thin chin" may be extracted. In addition, in the embodiments of the present disclosure, a virtual character may also be arbitrarily created in advance as a reference virtual character. Then every time the respective semantic feature is extracted for the target virtual character, the reference virtual character may be deformed based on the extracted semantic feature, so as to finally obtain the target virtual character desired by the user.

According to the embodiments of the present disclosure, as long as the user provides a semantic description of the target virtual character, the existing reference virtual character may be semantically modified as required by the user semantically, without the need for the user to perform additional manual customization operation, so as to implement the customization of the virtual character with high efficiency and high accuracy. In this way, user experience and acceptance of customized virtual character may also be improved.

In addition, the embodiments of the present disclosure provide convenience to the user, because the user only needs to give the semantic description of the target virtual character and it is not necessary for the user to perform additional manual customization operations.

As an optional embodiment, generating the target virtual character based on the semantic feature may include the following operations.

The reference virtual character is acquired.

Based on the semantic feature extracted from the semantic description generated by the user, the reference virtual character is deformed to generate the target virtual character.

In the embodiments of the present disclosure, a virtual character may be arbitrarily created as the reference virtual character in advance, and the reference virtual character is directly acquired in the process of customization of the target virtual character, and the semantic feature extracted from the semantic description generated by the user are used to drive the reference virtual character to deform, so as to obtain the respective target virtual character.

Exemplarily, a virtual character model of the reference virtual character may be created, and then a skeleton tree is created for the virtual character model, and then each skeleton node of the skeleton tree is skinned, so that the skeleton node and a respective skinned mesh node are associated to obtain the respective reference virtual character.

In addition, the deforming the reference virtual character based on the semantic feature extracted from the semantic description generated by the user may include: a virtual character slider (hereinafter referred to as a slider) with the semantic feature is acquired, and then the slider is used to drive the skeleton node of the reference virtual character to move, thereby driving the skinned mesh node of the reference virtual character to move accordingly. Finally, the target virtual character that the user wants is obtained, that is, the desired virtual character.

Exemplarily, if the user wants to create a target virtual character of "high nose, big eyes, thin chin", the following semantic feature "high nose, big eyes, thin chin" may be extracted based on the semantic description, and then three sliders of "high nose slider", "big eyes slider" and "thin chin slider" are acquired, and the three sliders are used to drive the pre-created reference virtual character to deform, so that finally the desired virtual character complying with the features of "high nose, big eyes, and thin chin" is obtained.

According to the embodiments of the present disclosure, the customized virtual character is customized by using artificial intelligence algorithms, on the one hand, the production efficiency of the customized virtual character may be improved, and more convenient user experience may be provided; on the other hand, the accuracy of customization of virtual character may be improved.

As an optional embodiment, the deforming the pre-created reference virtual character based on the semantic feature extracted from the semantic description generated by the user to generate the target virtual character may include the following operations.

The extracted semantic feature is converted into a professional semantic feature.

The reference virtual character is deformed based on the professional semantic feature obtained by the conversion.

It should be understood that in practice, different users may have different language descriptions of the same or similar characters. For example, for "thin chin", some users may describe it as "cone face", some users may describe it as "pointed face", and some users may even have other descriptions. In addition, in practical applications, it is difficult for users to give descriptions of the shapes of "cheekbones" and "chin". More generally, users will choose more general descriptions to portray a feeling about the virtual character, such as "like a little girl", "like a grandma", "sunshine", "handsome" and so on.

Therefore, the embodiments of the present disclosure propose to first convert the semantic feature extracted from the semantic description generated by the user uniformly into the professional semantic feature, and then the reference virtual character is deformed based on the converted semantic feature to obtain the final target virtual character.

Exemplarily, the semantic feature (that is, the general semantic feature given by the user) extracted by a semantic converter may be converted into the professional semantic feature. The professional semantic feature may be a semantic feature contained in a semantic description in anatomy and biology. Wherein, in the embodiments of the present disclosure, the semantic converter may be implemented by collecting a large amount of data and regression training in deep learning.

Figure 3:
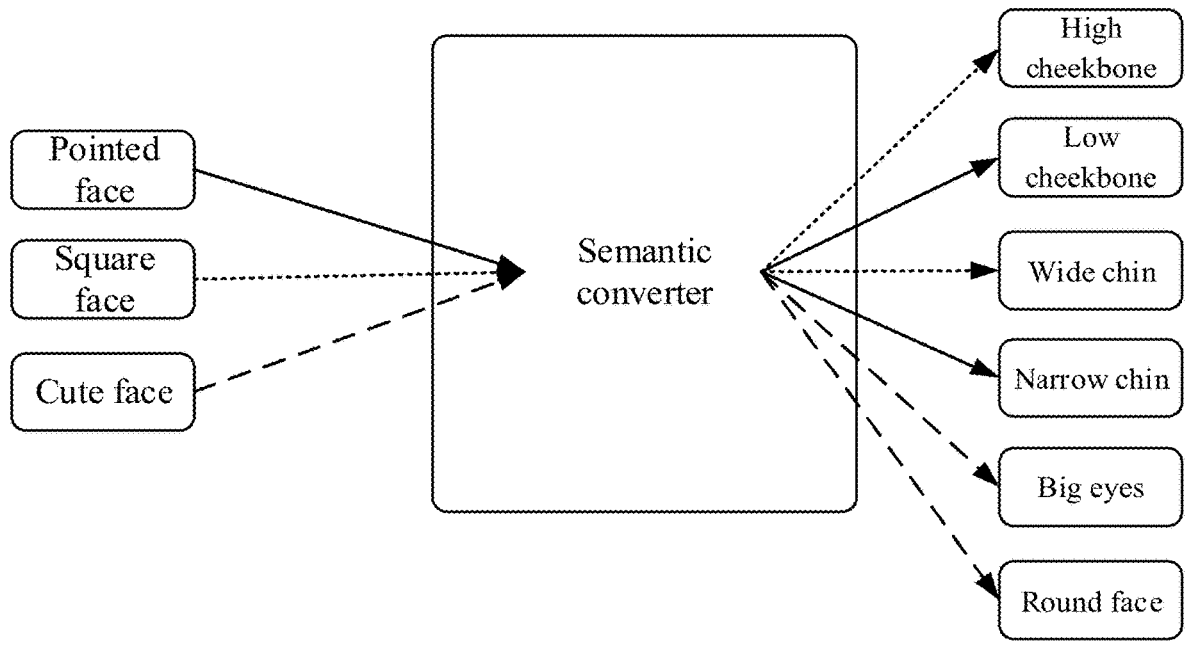
FIG. 3 exemplarily illustrates a schematic diagram of semantic transformation according to the embodiments of the present disclosure.

As shown in FIG. 3, in the embodiment of the present disclosure, taking the face shape as an example, the semantic keyword "pointed face" extracted from the language description generated by user may be converted into the following professional semantic features "low cheekbones" and "narrow chin"; the semantic keyword "square face" extracted from the language description generated by user may be converted into the following professional semantic features "high cheekbones" and "wide chin"; the semantic keyword "cute face" extracted from the language description generated by user may be converted into the following professional semantic features "big eyes" and "round face".

In addition, in the embodiments of the present disclosure, since the general semantic description generated by the user may be converted into the respective professional semantic description, a slider that drives the reference virtual character to deform may be created based on the professional semantics. For example, a high cheekbone slider, a low cheekbone slider, a narrow chin slider, a big eyes slider, a round face slider may be created. If the user enters "pointed face", it may be converted into two professional semantics, "low cheekbones" and "narrow chin". Then the two sliders "low cheekbone slider" and "narrow chin slider" are directly used to drive the reference virtual character to deform, and finally the desired virtual character of "pointed face" is implemented.

According to the embodiments of the present disclosure, even if the user inputs the general language description in practical applications, the respective professional language description may be obtained through semantic conversion. Then the reference virtual character is precisely deformed, so as to finally obtain the virtual character desired by the user.

As an optional embodiment, the deforming the reference virtual character based on professional semantic feature may include the following operations.

At least one slider is determined based on the professional semantic features, and each slider is associated with a specified semantic tag.

A plurality of respective skeleton nodes of the skeleton tree used for supporting the reference virtual character are driven to move based on the at least one slider.

Skinned mesh nodes associated with the plurality of respective skeleton nodes are driven to move based on the movement of the plurality of respective skeleton nodes.

Specifically, in the embodiments of the present disclosure, after the general semantic feature described by the user is converted into professional semantic feature, at least one keyword contained in the professional semantic feature obtained by the conversion may be extracted. Then at least one semantic tag containing the at least one keyword is found, and a slider associated with each semantic tag of the at least one semantic tag is found. Finally, the found slider is used to move the plurality of respective skeleton nodes of the skeleton tree used to support the reference virtual character, and then the skinned mesh nodes associated with the plurality of respective skeleton nodes are driven to move based on the movement of the plurality of respective skeleton nodes.

Figure 4A:
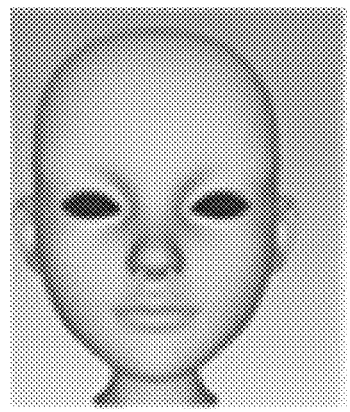
FIGS. 4A to 4D exemplarily illustrate schematic diagrams of a virtual character slider according to the embodiments of the present disclosure.
Figure 4B:
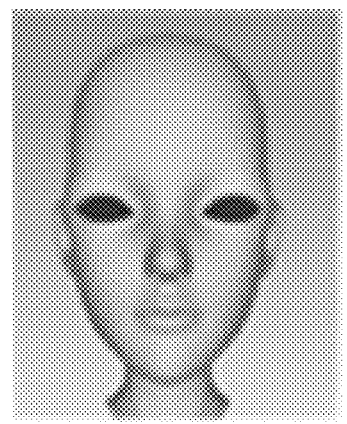
Figure 4C:
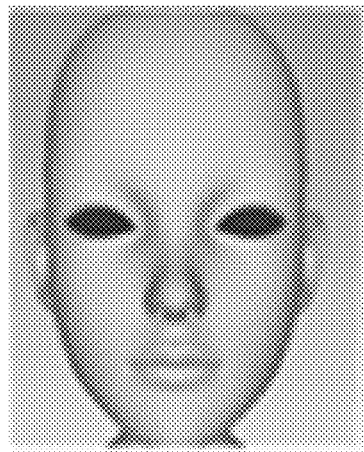
Figure 4D:
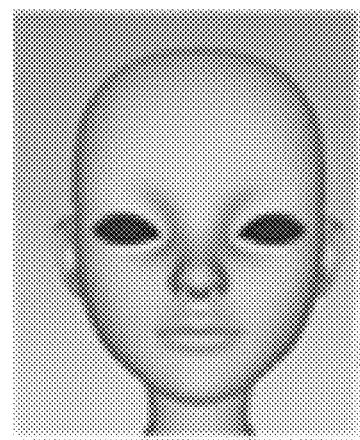
Figure 5:
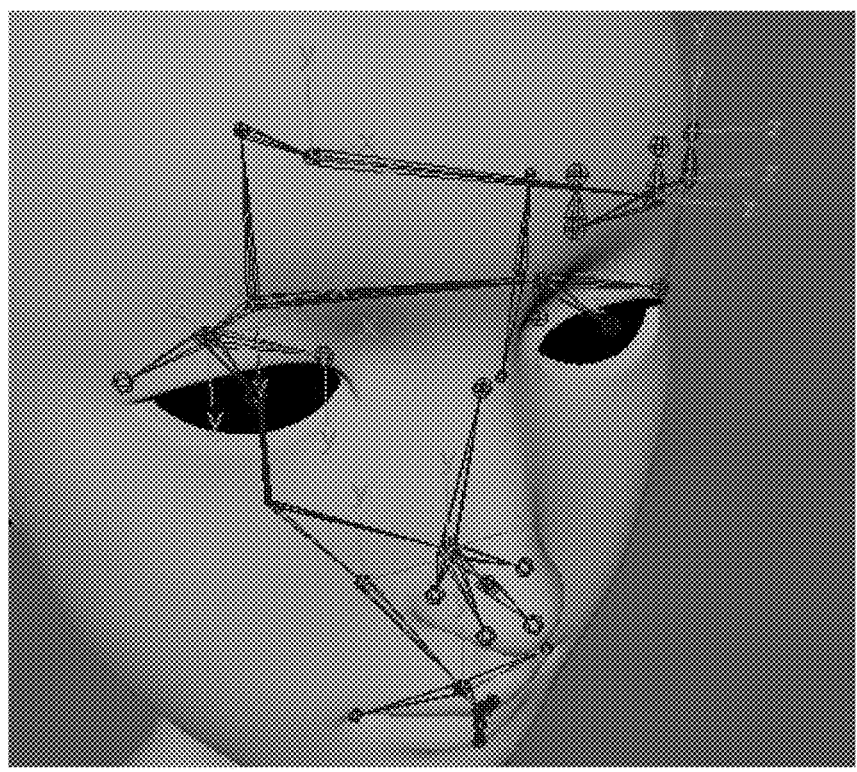
FIG. 5 exemplarily illustrates a schematic diagram of a reference virtual character in which binding of a skeleton and a skinned mesh are achieved according to the embodiments of the present disclosure.

Exemplarily, FIGS. 4A to 4D represent "wide face slider", "narrow face slider", "long face slider" and "short face slider" in sequence. FIG. 5 illustrates the reference virtual character in which the binding of the skeleton and the skin is achieved. Exemplarily, in the case that the general language description input by the user or the converted professional language description contains the "wide face" feature, the "wide face slider" as shown in FIG. 4A may be directly used to drive the reference virtual character to deform as shown in FIG. 5, thereby obtaining the target virtual character having the wide face feature.

According to the embodiments of the present disclosure, the slider with semantic information is used to deform the reference virtual character, which may improve the output efficiency of the target virtual character while improving the accuracy of the obtained target virtual character.

It should be noted that, in order to achieve deformation of the virtual character in less cost, 3D model designers usually design a skeleton tree for the face model, and a weight influence relationship is established between each skinned mesh node of the face mesh (skinned mesh) and each skeleton node of the skeleton tree. Afterwards, the deformation of each skeleton node may be transmitted to each skinned mesh node of the face skinned mesh by controlling the rotation, translation, and scaling of each skeleton node of the skeleton tree, and the deformation of each skinned mesh node may be implemented.

However, the skeleton tree is designed for the geometric structure of the human face, and most skeleton nodes do not have actual semantic meanings such as wide face and high nose. This makes the designer need to design a slider after completing the skinned mesh setting work, and then the slider is used to implement batch operations on each skeleton node of the skeleton tree, and semantic-level performance capability is finally achieved. For example, by using the wide face slider, eight skeleton nodes may be adjusted in batches, including left and right temples, left and right cheekbones, left and right mandibular angles, and left and right foreheads.

However, the linkage design of a large number of skeletons not only requires the designer's manpower cost, but also the complicated relationship between the skeletons often leads to the poor expressiveness of the designed semantic-level slider.

Therefore, the embodiments of the present disclosure propose an improved design scheme for a virtual character slider. After the designer completes the skinned mesh design, that is, after the designer completes the binding of skeleton and skinned mesh (also known as association of skeleton and skinned mesh), the designer may just focus on designing the shape model respective to the semantics without continuing to design the respective virtual character slider with semantic information. This is because the reference virtual character and the respective shape module designed by the designer by associating the skeleton and the skinned mesh are directly inputted into the "slider design system", a skeleton linkage coefficient with semantic information (that is, slider information) is automatically outputted, which may ensure the high-quality design of the slider.

The present disclosure also provides a method for processing a slider for a virtual character.

Figure 6A:
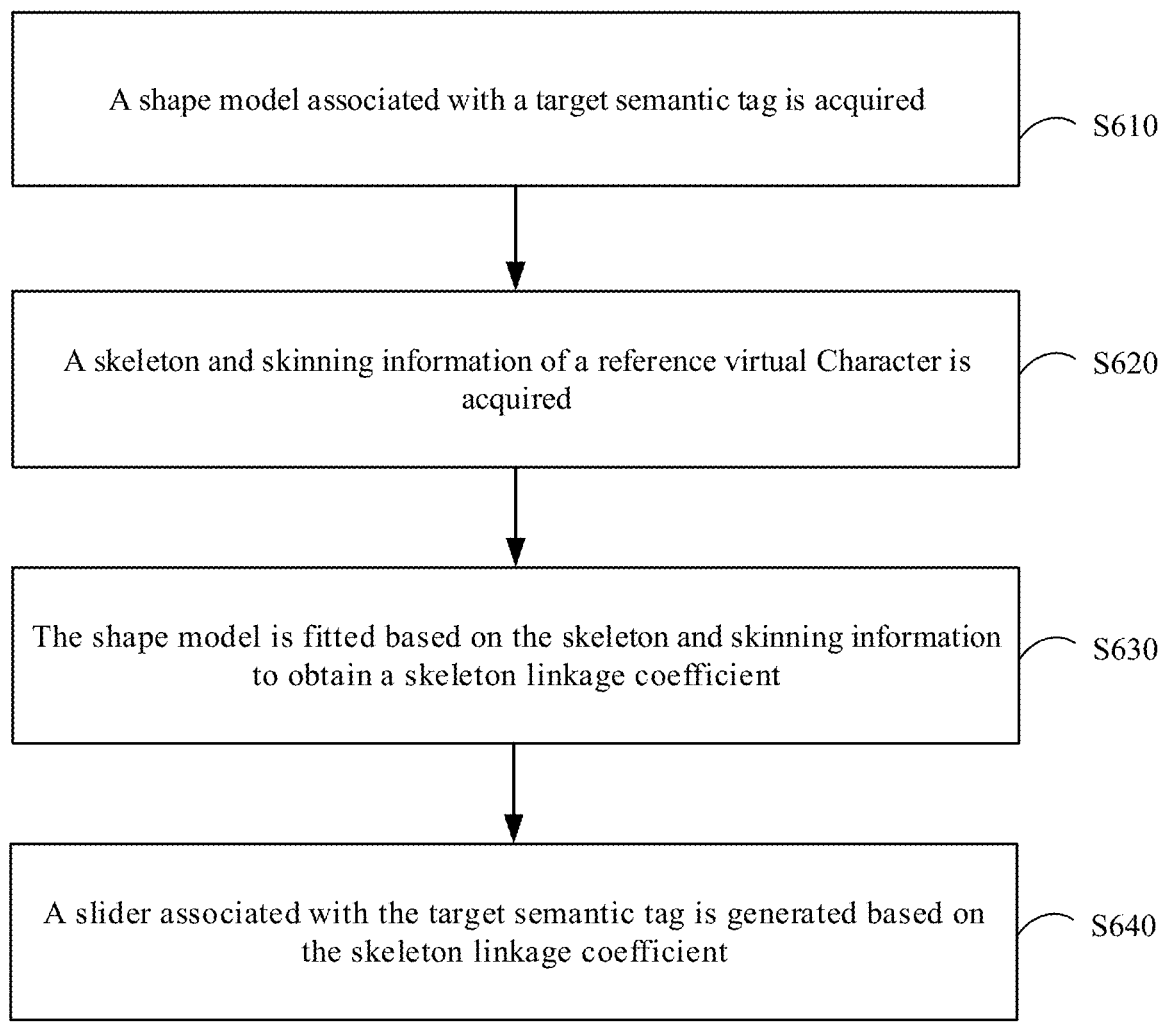
FIG. 6A exemplarily illustrates a flowchart of a method for processing a slider for a virtual character according to the embodiments of the present disclosure.

As shown in FIG. 6A, the method for processing a slider for a virtual character may include: operations S610 to S640.

In operation S610, a shape model associated with a target semantic tag is acquired. Where the target semantic tag is identical to a specified semantic tag associated with a slider.

In operation S620, a skeleton and skinning information of a reference virtual character is acquired.

In operation S630, the shape model is fitted based on the skeleton and skinning information to obtain a skeleton linkage coefficient.

In operation S640, a slider associated with the target semantic tag is generated based on the skeleton linkage coefficient.

wherein the slider is used to drive the reference virtual character to obtain a target virtual character complying with a target semantic feature contained in the target semantic tag.

Exemplarily, taking the face shape as an example, the "wide face model" (associated with the wide face tag) and the reference virtual character that has completed the binding of skeleton and skinned mesh are inputted into a skeleton coefficient fitting solver, and the "wide face skeleton linkage coefficient" (ie "wide face slider information") may be outputted; the "narrow face model" (associated with the narrow face tag) and the reference virtual character that has completed the binding of skeleton and skinned mesh are inputted into the skeleton coefficient fitting solver, and the "narrow face skeleton linkage coefficient" (ie "narrow face slider information") may be outputted; the "long face model" (associated with the long face tag) and the reference virtual character that has completed the binding of skeleton and skinned mesh are inputted into the skeleton coefficient fitting solver, the "long face skeleton linkage coefficient" (ie "long face slider information") may be outputted; the "short face model" (associated with the short face tag) and the reference virtual character that has completed the binding of skeleton and skinned mesh are inputted into the skeleton coefficient fitting solver, the "short face skeleton linkage coefficient" (ie, "short face slider information") may be outputted. Wherein the skeleton coefficient fitting solver is used to fit each shape model based on the skeleton and skinning information of the reference virtual character, so as to obtain the respective skeleton linkage coefficient. After obtaining the respective skeleton linkage coefficient, associate it with the respective semantic tag, and the slider of respective semantic may be obtained. For example, the "wide face slider information" is associated with the "wide face tag", the "wide face slider" may be obtained.

It should be noted that in another embodiment of the present disclosure, the skeleton and skinning information of the reference virtual character and a plurality of shape models (each shape model corresponds to a different semantic tag) may also be transmitted into the skeleton coefficient fitting solver, so as to automatically acquire a plurality of sliders respective to each semantic tag, and the efficient production of sliders is ensured.

Figure 6B:
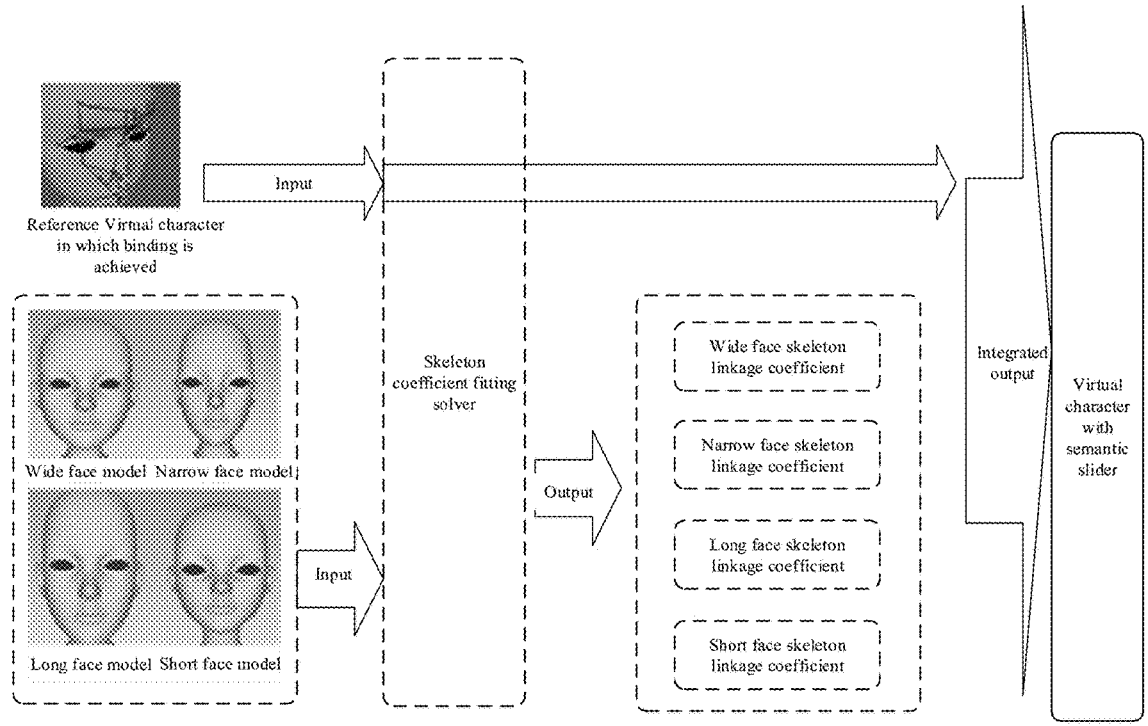
FIG. 6B exemplarily illustrates a schematic diagram of generating a virtual character slider according to the embodiments of the present disclosure.

Exemplarily, as shown in FIG. 6B, taking the face shape as an example, the "wide face model", "narrow face model", "long face model" and "short face model" and a reference virtual character in which binding of skeleton and skinned mesh is achieved are inputted into a skeleton coefficient fitting solver, thereby automatically outputting "wide face slider", "narrow face slider", "long face slider" and "short face slider".

It should be understood that the semantic slider design is implemented by linkage of a plurality of skeleton nodes under the design of designer. Specifically, the skeleton generally may transform in three freedoms, i.e. translation, rotation, and scale. The designer will set weight for the skinned mesh node affected by the skeleton. In actual deformation, the skinned mesh node performs weighted deformation according to the skeleton transformation data and the respective weight set.

However, a slider may usually affect a plurality of skeleton nodes. The designer designs the influence relationship of the slider on the plurality of skeleton nodes, so that the slider has respective semantics, such as "low cheekbones" slider, "pointed chin" slider, etc., but achieving the semantic features relies on the linkage of the plurality of skeleton nodes to achieve.

With the embodiments of the present disclosure, the designer may just focus on the design of the shape model associated with the semantic tag, and then the shape model may be fitted by the skeleton coefficient fitting solver to implement the slider design. That is, the embodiments of the present disclosure integrate the skeleton coefficient fitting ability and redefine the generation method and production process of the slider, which comprehensively reduces the burden of the designer on the slider design. The designer gets rid of the cumbersome multi-skeleton linkage design and may focus more on the design of the semantically respective shape model. Therefore, the designer may be liberated from the complex multi-skeleton node linkage design, thereby improving the production efficiency of digital assets.

As an optional embodiment, the reference virtual character may be created through the following operations.

A respective skeleton tree is created for the reference virtual character,

A skeleton is associated with a skinned mesh based on the skeleton tree to obtain the reference virtual character.

Exemplarily, taking the face model as an example, the designer may design a skeleton tree for face model, and the face skinned mesh (skinned mesh) is associated with each skeleton node of the skeleton tree to implement the binding of face skinned mesh and each skeleton node, in order to obtain the respective reference virtual character.

As an optional embodiment, fitting the shape model based on the skeleton and skinning information to obtain the respective skeleton linkage coefficient may include the following operations.

Based on the skeleton and skinning information, the shape model is iteratively solved from a root skeleton node to a leaf skeleton node of the skeleton tree one by one to obtain the skeleton linkage coefficient.

Wherein the skeleton tree is created for the reference virtual character.

According to the embodiments of the present disclosure, the skeleton linkage coefficient may be obtained through a bottom-up iterative algorithm, so the fitting calculation efficiency is higher.

As an optional embodiment, the iterative solution of the shape model from the root skeleton node to the leaf skeleton node of the skeleton tree one by one may include: fitting for a rotation coefficient, a translation coefficient and a scaling coefficient of each skeleton node by applying the least square method from the root skeleton node of the skeleton tree level-by-level, until the rotation coefficients, the translation coefficients and the scaling coefficients of all the leaf skeleton nodes of the skeleton tree are solved.

It should be noted that, in the embodiments of the present disclosure, the skeleton coefficient fitting solver may adopt a bottom-up solving strategy. That is, the least square method is applied from the root node of the skeleton tree level-by-level to fit for the rotation coefficient, the translation coefficient and the scaling coefficient of each node of the shape model respectively, until all the leaf nodes of the skeleton tree are solved.

As an optional embodiment, fitting the shape model based on the skeleton and skinning information to obtain the respective skeleton linkage coefficient may include: based on the skeleton and skinning information, the shape model is iteratively solved from a root skeleton node to a leaf skeleton node of the skeleton tree one by one in a plurality of rounds to obtain the skeleton linkage coefficient. Wherein the skeleton tree is created for the reference virtual character.

According to the embodiments of the present disclosure, the skeleton linkage coefficient may be obtained by performing a bottom-up iterative algorithm in a plurality of rounds, that is, the fitting coefficients of the skeleton tree node(s) at each level are solved level-by-level, so as to obtain a more accurate fitting result.

In addition, the embodiments of the present disclosure may also support other types of skeleton coefficient fitting calculation algorithms, and the embodiments of the present disclosure are not limited herein.

The embodiments of the present disclosure implement the intelligent generation of the virtual character slider through the integration of related algorithms and the semantic definition of the input and output of the slider intelligent generation system.

As an optional embodiment, fitting the shape model based on the skeleton and skinning information to obtain the respective skeleton linkage coefficient may include: the skeleton and skinning information and the shape model are inputted into the preset skeleton coefficient fitting solver, so that the shape model is fitted by the skeleton coefficient fitting solver, so as to obtain the skeleton linkage coefficient.

According to the embodiments of the present disclosure, the designer may just focus on the design of the shape model associated with the semantic tag, and then the shape model may be fitted by the skeletal coefficient fitting solver to implement the slider design.

As an optional embodiment, the method may further include: the skeleton and skinning information and the generated slider are stored in the same file.

Exemplarily, after the "wide face slider" is obtained, if the "wide face slider" and the "reference virtual character" are stored in the same file, the "wide face slider" may automatically drive the "reference virtual character" to generate a "wide face virtual character" after the "wide face virtual character" startup process is triggered.

According to the embodiments of the present disclosure, the virtual character slider and the reference virtual character are stored in the same file, and when the virtual character is started, the reference virtual character may be directly driven by the slider to quickly output a target virtual character described by the user.

As an optional embodiment, generating the target virtual character based on semantic feature may include the following operations.

At least one semantic tag is determined cased on the semantic feature.

The respective at least one accessory model and/or at least one decoration model is determined based on the semantic tag.

On the basis of the virtual character obtained by deforming the reference virtual character, at least one accessory model and/or at least one decoration model is added, to obtain the target virtual character.

Exemplarily, if the user wants to create a target virtual character with "high nose, big eyes, thin chin, long hair, student clothes, white sneakers", the following semantic features "high nose, big eyes, thin chin" may be extracted first based on the semantic description. Then three sliders are acquired: "high nose slider", "big eye slider" and "slim chin slider", and the 3 sliders are used to deform the pre-created reference virtual character, so as to obtain a virtual character that meets the features of "high nose, big eyes and thin chin". At the same time, the following semantic features "long hair, student clothes, white sneakers" may also be extracted based on the semantic description, accessory models such as "long hair model" are acquired from the digital asset library of hairstyle accessory, and decoration models such as "girl student clothing model" and "white sneaker model" are acquired from the clothing digital asset library including clothing, shoes, hats, etc. Finally, the "long hair model", "girl school wear model" and "white sneakers model" are added to the previously created virtual character with the features of "high nose, big eyes and thin chin", and the finally output virtual character is the target virtual character that the user wants.

It should be understood that in the embodiments of the present disclosure, the digital asset library of hairstyles and beard accessories may include various types of men's beard models, various types of men's hairstyle models, and various types of women's hairstyle models. It should also be understood that the clothing digital asset library may contain various male and female glasses, clothes, shoes, watches, gloves, headwear, scarves and other accessory models. Each model in the digital asset library is associated with a unique semantic tag, so that the respective model may be automatically acquired based on the semantic tag.

Exemplarily, a different semantic tag may be defined for each model in the digital asset library, such as white sneaker, high heels, little red skirt, student wear, professional formal wear and so on. According to the semantic tags such as hairstyle and clothing output by the semantic converter, the respective model may be selected from the digital asset library and added to the generated virtual character.

Figure 7:
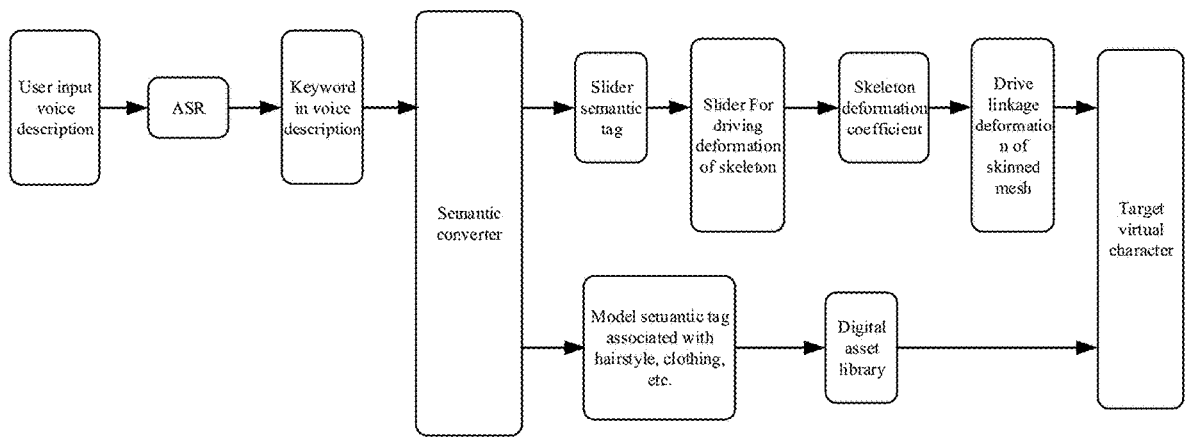
FIG. 7 exemplarily illustrates a schematic diagram of generating a virtual character according to the embodiments of the present disclosure.

As shown in FIG. 7, the customization process of a customized virtual character may be as follows: user enters a voice description; a speech recognition is automatically performed through ASR technology; a keyword of the voice description is extracted; the extracted keyword is converted through a semantic converter; a slider semantic tag associated with a slider is acquired from the converted keyword; a slider that drives the skeleton deformation is acquired based on the slider semantic tag; a respective skeleton deformation coefficient is acquired based on the slider; a linkage deformation of skinned mesh is driven based on the skeleton deformation coefficient; a model semantic tag associated with hairstyle, clothing, etc. is acquired from the converted keyword; a respective model is acquired from a digital asset library based on the model semantic tag; the acquired model is added to a virtual character generated by the linkage deformation of the skinned mesh to obtain a final target virtual character.

According to the embodiments of the present disclosure, the target virtual character may be beautified and enriched through accessory, so as to obtain a target virtual character satisfying the user.

According to the embodiments of the present disclosure, the present disclosure also provides an apparatus for processing a slider for a virtual character.

Figure 8:
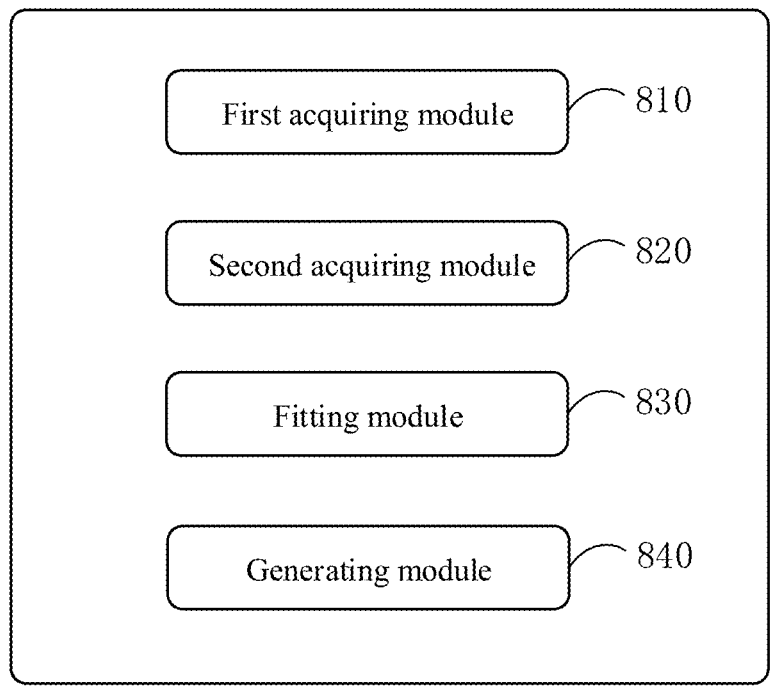
FIG. 8 exemplarily illustrates a block diagram of an apparatus for processing a slider for a virtual character according to an embodiment of the present disclosure.

FIG. 8 exemplarily illustrates a block diagram of an apparatus for processing a slider for a virtual character according to the embodiments of the present disclosure.

As shown in FIG. 8, the apparatus 800 for processing a slider for a virtual character includes: a first acquiring module 810, a second acquiring module 820, a fitting module 830 and a generating module 840.

The first acquiring module 810 is configured to acquire a shape model associated with a target semantic tag.

The second acquiring module 820 is configured to acquire a skeleton and skinning information of a reference virtual character.

The fitting module 830 is configured to fit the shape model based on the skeleton and skinning information to obtain a respective skeleton linkage coefficient.

The generating module 840 is configured to generate a slider associated with the target semantic tag based on the skeleton linkage coefficient. Wherein the slider is used to drive the reference virtual character to obtain a target virtual character complying with a target semantic feature contained in the target semantic tag.

As an optional embodiment, the apparatus further includes: a creating module configured to create the reference virtual character. The creating module includes: a creating unit configured to create a respective skeleton tree for the reference virtual character; and an associating unit configured to associate a skeleton with a skinned mesh based on the skeleton tree to obtain the reference virtual character.

As an optional embodiment, the fitting module is also configured to: based on the skeleton and skinning information, the shape model is iteratively solved from a root skeleton node to a leaf skeleton node of the skeleton tree one by one to obtain the skeleton linkage coefficient; wherein the skeleton tree is created for the reference virtual character.

As an optional embodiment, the fitting module is also configured to: the least square method is applied to fit for a rotation coefficient, a translation coefficient and a scaling coefficient of each skeleton node by applying a least square method from the root skeleton node of the skeleton tree level-by-level, until the rotation coefficients, the translation coefficients and the scaling coefficients of all the leaf skeleton nodes of the skeleton tree are solved.

As an optional embodiment, the fitting module is also configured to: based on the skeleton and skinning information, the shape model is iteratively solved from a root skeleton node to a leaf skeleton node of the skeleton tree one by one in a plurality of rounds to obtain the skeleton linkage coefficient. Wherein the skeleton tree is created for the reference virtual character.

As an optional embodiment, the fitting module is also configured to: the skeleton and skinning information and the shape model are inputted into a preset skeleton coefficient fitting solver, so that the shape model is fitted by the skeleton coefficient fitting solver, so as to obtain the skeleton linkage coefficient.

As an optional embodiment, the apparatus further includes: a storage module configured to store the skeleton and skinning information and the generated slider in the same file.

It should be understood that the embodiments of the apparatus of the present disclosure are the same as or similar to the embodiments of the method of the present disclosure, and have a technical effect being the same as or similar to that of the embodiments of the method of the present disclosure, which will not be repeated here.

Collecting, storing, using, processing, transmitting, providing, and disclosing etc. of the personal information of the user involved in the present disclosure all comply with the relevant laws and regulations, and do not violate the public order and morals.

According to the embodiments of the present disclosure, the present disclosure also provides an electronic device, a readable storage medium and a computer program product.

Figure 9:
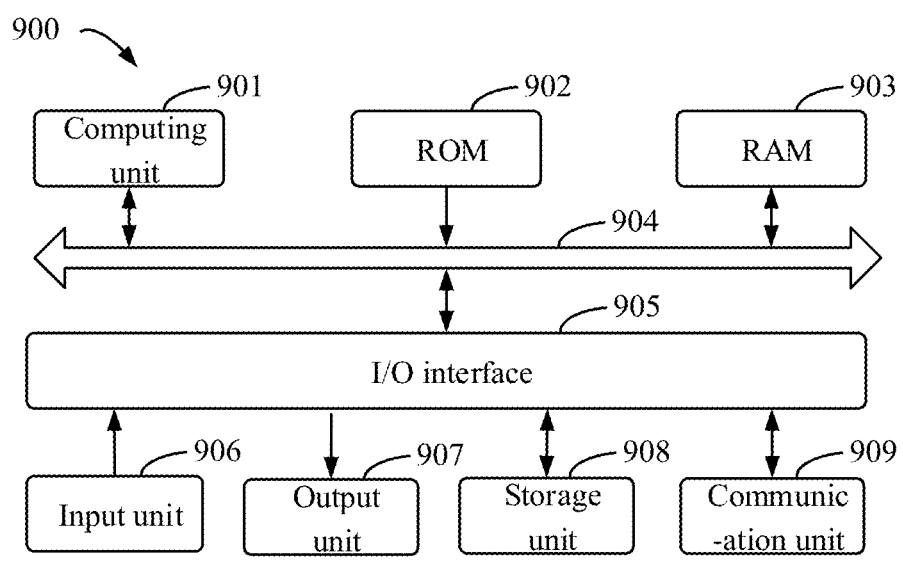
FIG. 9 exemplarily illustrates a block diagram of an electronic device used to implement an apparatus of generating a virtual character in the embodiments of the present disclosure.

FIG. 9 illustrates a schematic block diagram of an example electronic device 900 that may be used to implement embodiments of the present disclosure. The electronic device is intended to represent various forms of digital computers, such as laptop computers, desktop computers, workstations, personal digital assistants, servers, blade servers, mainframe computers and other suitable computers. The electronic device may also represent various forms of mobile devices, such as personal digital processing, cellular phones, smart phones, wearable devices and other similar computing devices. The components shown herein, their connections and relationships, and their functions are merely examples, and are not intended to limit the implementation of the present disclosure described and/or required herein.

As shown in FIG. 9, the device 900 includes a computing unit 901, which may execute various appropriate actions and processing according to a computer program stored in a read only memory (ROM) 902 or a computer program loaded from a storage unit 908 into a random access memory (RAM) 903. Various programs and data required for the operation of the device 900 may also be stored in the RAM 903. The computing unit 901, the ROM 902 and the RAM 903 are connected to each other through a bus 904. An input/output (I/O) interface 905 is also connected to the bus 904.

The I/O interface 905 is connected to a plurality of components of the device 900, including: an input unit 906, such as a keyboard, a mouse, etc.; an output unit 907, such as various types of displays, speakers, etc.; a storage unit 908, such as a magnetic disk, an optical disk, etc.; and a communication unit 909, such as a network card, a modem, a wireless communication transceiver, etc. The communication unit 909 allows the device 900 to exchange information/data with other devices through the computer network such as the Internet and/or various telecommunication networks.

The computing unit 901 may be various general-purpose and/or special-purpose processing components with processing and computing capabilities. Some examples of computing unit 901 include, but are not limited to, central processing unit (CPU), graphics processing unit (GPU), various dedicated artificial intelligence (AI) computing chips, various computing units that run machine learning model algorithms, digital signal processing DSP and any appropriate processor, controller, microcontroller, etc. The computing unit 901 executes the various methods and processes described above, such as the method for processing a slider for a virtual character. For example, in some embodiments, the method for processing a slider for a virtual character may be implemented as computer software programs, which are tangibly contained in the machine-readable medium, such as the storage unit 908. In some embodiments, part or all of the computer program may be loaded and/or installed on the device 900 via the ROM 902 and/or the communication unit 909. When the computer program is loaded into the RAM 903 and executed by the computing unit 901, one or more steps of the method for processing a slider for a virtual character described above may be executed. Alternatively, in other embodiments, the computing unit 901 may be configured to execute the method for processing a slider for a virtual character in any other suitable manner (for example, by means of firmware).

Various implementations of the systems and technologies described in the present disclosure may be implemented in digital electronic circuit systems, integrated circuit systems, field programmable gate arrays (FPGA), application specific integrated circuits (ASIC), application-specific standard products (ASSP), system-on-chip SOC, load programmable logic device (CPLD), computer hardware, firmware, software and/or their combination. The various implementations may include: being implemented in one or more computer programs, the one or more computer programs may be executed and/or interpreted on a programmable system including at least one programmable processor, the programmable processor may be a dedicated or general programmable processor. The programmable processor may receive data and instructions from a storage system, at least one input device and at least one output device, and the programmable processor transmit data and instructions to the storage system, the at least one input device and the at least one output device.

The program code used to implement the method of the present disclosure may be written in any combination of one or more programming languages. The program codes may be provided to the processors or controllers of general-purpose computers, special-purpose computers or other programmable data processing devices, so that the program code enables the functions/operations specific in the flowcharts and/or block diagrams to be implemented when the program code executed by a processor or controller. The program code may be executed entirely on the machine, partly executed on the machine, partly executed on the machine and partly executed on the remote machine as an independent software package, or entirely executed on the remote machine or server.

In the context of the present disclosure, the machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, device, or device, or any suitable combination of the above-mentioned content. More specific examples of the machine-readable storage media would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device or any suitable combination of the above-mentioned content.

In order to provide interaction with users, the systems and techniques described here may be implemented on a computer, the computer includes: a display device (for example, a CRT (cathode ray tube) or LCD (liquid crystal display) monitor) for displaying information to the user; and a keyboard and a pointing device (for example, a mouse or trackball). The user may provide input to the computer through the keyboard and the pointing device. Other types of devices may also be used to provide interaction with users. For example, the feedback provided to the user may be any form of sensory feedback (for example, visual feedback, auditory feedback or tactile feedback); and any form (including sound input, voice input, or tactile input) may be used to receive input from the user.

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation of the system and technology described herein), or in a computing system including any combination of such back-end components, middleware components or front-end components. The components of the system may be connected to each other through any form or medium of digital data communication (for example, a communication network). Examples of communication networks include: local area network (LAN), wide area network (WAN) and the Internet.

The computer system may include a client and a server. The client and the server are generally far away from each other and usually interact through the communication network. The relationship between the client and the server is generated by computer programs that run on the respective computers and have a client-server relationship with each other. The server may be a cloud server, a server of a distributed system, or a server combined with a blockchain.

It should be understood that the various forms of processes shown above may be used to reorder, add or delete steps. For example, the steps described in the present disclosure may be executed in parallel, sequentially or in a different order, as long as the desired result of the technical solution disclosed in the present disclosure may be achieved, which is not limited herein.

The above-mentioned implementations do not constitute a limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for processing a slider for a virtual character, comprising:
   acquiring a shape model associated with a target semantic tag;
   acquiring a skeleton and skinning information of a reference virtual character;
   fitting the shape model based on the skeleton and skinning information to obtain a skeleton linkage coefficient; and
   generating a slider associated with the target semantic tag based on the skeleton linkage coefficient,
   wherein the slider is used to drive the reference virtual character to obtain a target virtual character complying with a target semantic feature contained in the target semantic tag,
   wherein fitting the shape model based on the skeleton and skinning information to obtain a skeleton linkage coefficient comprises:
      iteratively solving the shape model from a root skeleton node to a leaf skeleton node of a skeleton tree one by one based on the skeleton and skinning information to obtain the skeleton linkage coefficient,
      wherein the skeleton tree is created for the reference virtual character, and
   wherein iteratively solving the shape model from a root skeleton node to a leaf skeleton node of a skeleton tree one by one comprises:
      fitting for a rotation coefficient, a translation coefficient, and a scale coefficient of each skeleton node by applying a least square method from the root skeleton node of the skeleton tree level-by-level, until the rotation coefficients, the translation coefficients and the scaling coefficients of all the leaf skeleton nodes of the skeleton tree are solved.

2. The method of claim 1, wherein the reference virtual character is created by:
   creating a skeleton tree for the reference virtual character; and
   associating a skeleton with a skinned mesh based on the skeleton tree to obtain the reference virtual character.

3. The method of claim 2, wherein fitting the shape model based on the skeleton and skinning information to obtain a skeleton linkage coefficient comprises:
   iteratively solving the shape model from a root skeleton node to a leaf skeleton node of the skeleton tree one by one in a plurality of rounds based on the skeleton and skinning information to obtain the skeleton linkage coefficient.

4. The method of claim 1, wherein fitting the shape model based on the skeleton and skinning information to obtain a skeleton linkage coefficient comprises:
   iteratively solving the shape model from a root skeleton node to a leaf skeleton node of a skeleton tree one by one in a plurality of rounds based on the skeleton and skinning information to obtain the skeleton linkage coefficient;
   wherein the skeleton tree is created for the reference virtual character.

5. The method of claim 1, wherein fitting the shape model based on the skeleton and skinning information to obtain a skeleton linkage coefficient comprises:
   inputting the skeleton and skinning information and the shape model to a preset skeleton coefficient fitting solver, so that the shape model is fitted by the skeleton coefficient fitting solver, so as to obtain the skeleton linkage coefficient.

6. The method of claim 1, further comprising:
storing the skeleton and skinning information and the generated slider in the same file.

7. An electronic device, comprising:
at least one processor; and
a memory communicatively connected with the at least one processor;
wherein the memory stores instructions executable by the at least one processor, and the instructions is executed by the at least one processor to cause the at least one processor to perform the method of claim 1.

8. The electronic device of claim 7, wherein the at least one processor is further configured to:
create a skeleton tree for the reference virtual character; and
associate a skeleton with a skinned mesh based on the skeleton tree to obtain the reference virtual character.

9. The electronic device of claim 7, wherein the at least one processor is further configured to:
iteratively solve the shape model from a root skeleton node to a leaf skeleton node of a skeleton tree one by one in a plurality of rounds based on the skeleton and skinning information to obtain the skeleton linkage coefficient;
wherein the skeleton tree is created for the reference virtual character.

10. A non-transitory computer-readable storage medium storing computer instructions, wherein the computer instructions are configured to cause the computer to perform the method of claim 1.

11. The method of claim 10, wherein the computer instructions are further configured to cause the computer to:
create a skeleton tree for the reference virtual character; and
associate a skeleton with a skinned mesh based on the skeleton tree to obtain the reference virtual character.

12. The method of claim 10, wherein the computer instructions are further configured to cause the computer to:
iteratively solve the shape model from a root skeleton node to a leaf skeleton node of a skeleton tree one by one in a plurality of rounds based on the skeleton and skinning information to obtain the skeleton linkage coefficient;
wherein the skeleton tree is created for the reference virtual character.

* * * * *